United States Patent
Honda et al.

(10) Patent No.: US 11,904,847 B2
(45) Date of Patent: Feb. 20, 2024

(54) AUTOMATIC PARKING SYSTEM, AUTOMATIC PARKING METHOD, AND STORAGE MEDIUM

(71) Applicant: TOYOTA JIDOSHA KABUSHIKI KAISHA, Toyota (JP)

(72) Inventors: Daisaku Honda, Kasugai (JP); Hiroya Matsubayashi, Nisshin (JP); Ryota Tomizawa, Mishima (JP); Satoshi Tanabe, Susono (JP); Nobutsugu Maruiwa, Mishima (JP); Yasuhiro Kobatake, Nagoya (JP); Hiroki Awano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/868,455

(22) Filed: Jul. 19, 2022

(65) Prior Publication Data
US 2023/0064215 A1  Mar. 2, 2023

(30) Foreign Application Priority Data
Aug. 31, 2021 (JP) ................... 2021-141541

(51) Int. Cl.
| | |
|---|---|
| *B60W 30/06* | (2006.01) |
| *G08G 1/14* | (2006.01) |
| *G06V 20/54* | (2022.01) |
| *G06V 20/58* | (2022.01) |
| *G08G 1/017* | (2006.01) |

(52) U.S. Cl.
CPC ............ *B60W 30/06* (2013.01); *G06V 20/54* (2022.01); *G06V 20/58* (2022.01); *G08G 1/0175* (2013.01); *G08G 1/145* (2013.01); *G06V 2201/08* (2022.01)

(58) Field of Classification Search
CPC ....... B60W 30/06; G06V 20/54; G06V 20/58; G06V 2201/08; G08G 1/145
See application file for complete search history.

(56) References Cited

U.S. PATENT DOCUMENTS

| | | | |
|---|---|---|---|
| 2018/0052460 A1* | 2/2018 | Kurt ..................... | B60W 30/06 |
| 2018/0336787 A1 | 11/2018 | Ohnishi et al. | |
| 2019/0066503 A1* | 2/2019 | Li ........................ | G08G 5/0013 |
| 2020/0074859 A1 | 3/2020 | Eshima | |
| 2023/0091505 A1* | 3/2023 | Fujita ................... | B60W 40/04 |
| | | | 701/23 |

FOREIGN PATENT DOCUMENTS

| | | |
|---|---|---|
| JP | 2018-195289 A | 12/2018 |
| JP | 2020-035071 A | 3/2020 |

* cited by examiner

*Primary Examiner* — Mohamed Barakat
(74) *Attorney, Agent, or Firm* — Sughrue Mion, PLLC

(57) ABSTRACT

An automatic parking system includes an infrastructure sensor that is able to detect a state of a parking lot. A blind spot area that does not allow the state of the parking lot to be detected by the infrastructure sensor is identified in the parking lot, and the state of the parking including the blind spot area, the state of the parking lot being detected by an on-board sensor of a vehicle in the parking lot, is acquired. Based on the state of the parking lot detected by the infrastructure sensor and the state of the parking lot that includes the blind spot area and that is detected by the on-board sensor of the vehicle in the parking lot, a travel route for the vehicle traveling in the parking lot is generated.

9 Claims, 7 Drawing Sheets

AUTOMATIC PARKING SYSTEM, AUTOMATIC PARKING METHOD, AND STORAGE MEDIUM

CROSS-REFERENCE TO RELATED APPLICATION

This application claims priority to Japanese Patent Application No. 2021-141541 filed on Aug. 31, 2021, incorporated herein by reference in its entirety.

BACKGROUND

1. Technical Field

The present disclosure relates to an automatic parking system, an automatic parking method, and a storage medium.

2. Description of Related Art

In an automatic parking system for an autonomous vehicle, an automatic parking system is known in which an infrastructure sensor that can detect the state of a parking lot, for example, a camera that can capture an image of the inside of the parking lot is installed, and based on the image captured by the camera, a travel route for a vehicle that enters and leaves the parking lot is calculated (see, for example, Japanese Unexamined Patent Application Publication No. 2020-35071 (JP 2020-35071 A)).

SUMMARY

However, a vehicle in a parking lot may cause a blind spot for a range detected by an infrastructure sensor, and in this case, there is a problem in which it is difficult to generate an appropriate travel route for a vehicle on which the vehicle does not come into contact with a mobile body and a fixed structure in the parking lot.

In order to solve such a problem, the present disclosure provides an automatic parking system including
an infrastructure sensor that is able to detect a state of a parking lot;
an identification unit that identifies a blind spot area that does not allow the state of the parking lot to be detected by the infrastructure sensor in the parking lot;
an acquisition unit that acquires the state of the parking lot including the blind spot area, the state of the parking lot being detected by an on-board sensor of a vehicle in the parking lot; and
a travel route generation unit that generates a travel route for the vehicle traveling in the parking lot based on the state of the parking lot detected by the infrastructure sensor and the state of the parking lot that includes the blind spot area and that is detected by the on-board sensor of the vehicle in the parking lot.

Further, the present disclosure provides an automatic parking method using an infrastructure sensor that is able to detect a state of a parking lot. The automatic parking method includes identifying a blind spot area that does not allow the state of the parking lot to be detected by the infrastructure sensor in the parking lot;
acquiring the state of the parking lot including the blind spot area, the state of the parking lot being detected by an on-board sensor of a vehicle in the parking lot; and
generating a travel route for the vehicle traveling in the parking lot based on the state of the parking lot detected by the infrastructure sensor and the state of the parking lot that includes the blind spot area and that is detected by the on-board sensor of the vehicle in the parking lot.

Further, the present disclosure provides a storage medium storing a program for executing automatic parking using an infrastructure sensor that is able to detect a state of a parking lot. The program causes a computer to function so as to identify a blind spot area that does not allow the state of the parking lot to be detected by the infrastructure sensor in the parking lot;
acquire the state of the parking lot including the blind spot area, the state of the parking lot being detected by an on-board sensor of a vehicle in the parking lot; and
generate a travel route for the vehicle traveling in the parking lot based on the state of the parking lot detected by the infrastructure sensor and the state of the parking lot that includes the blind spot area and that is detected by the on-board sensor of the vehicle in the parking lot.

It is possible to give an appropriate entry and leaving instruction.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
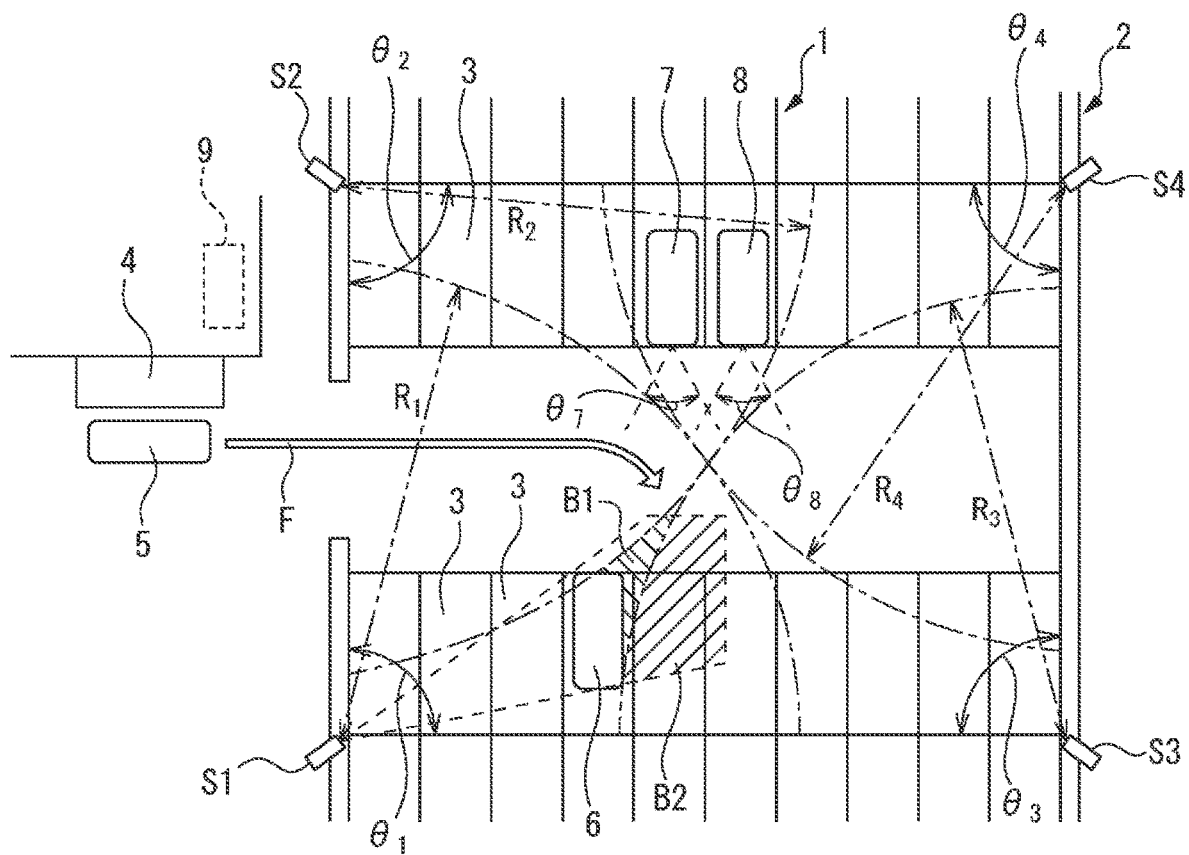
FIG. 1 is a plan view graphically illustrating an example of an automatic parking lot.
Figure 2:
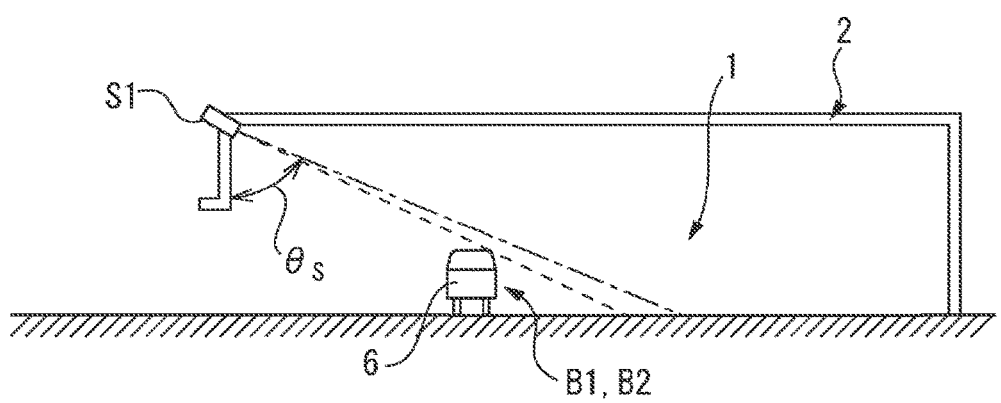
FIG. 2 is a side view of the automatic parking lot shown in FIG. 1.

FIG. 1 is a plan view graphically illustrating only a part of an automatic parking lot, and FIG. 2 is a side view of the automatic parking lot shown in FIG. 1. Referring to FIGS. 1 and 2, the numeral 1 indicates a parking lot, the numeral 2 indicates an automatic parking lot building, the numeral 3 indicates multiple parking spaces, the numeral 4 indicates a boarding and alighting place, the numeral 5 indicates an autonomous vehicle stopped at the boarding and alighting place 4, and the numerals 6, 7, and 8 indicate autonomous vehicles parked in the parking spaces 3 in the parking lot 1. In this parking lot 1, an automatic parking service, that is, an automated valet parking service is performed in which the autonomous vehicle 5 that has reached the boarding and alighting place 4 is autonomously driven to an empty parking space 3, and the autonomous vehicles 6, 7, and 8 parked in the parking spaces 3 are autonomously driven to the boarding and alighting place 4. On the other hand, in FIG. 1, the numeral 9 indicates an entry and leaving management server that is located at a parking management facility and that manages entry and leaving of the vehicle. In this automatic parking lot, a manually driven vehicle can also be parked.

In a case where a user who uses this automatic parking service parks an own vehicle in the parking lot 1, for example, when the own vehicle reaches the boarding and alighting place 4, for example, the user transmits an entry request together with a vehicle identification (ID) for identifying the own vehicle to the entry and leaving management server 9 via a communication network from a mobile terminal of the user. Upon receiving the entry request, the entry and leaving management server 9 sets a travel route for the vehicle such that the vehicle can reach the empty parking space 3 from the boarding and alighting place 4 without coming into contact with other vehicles and pedestrians, and transmits the set travel route to the vehicle of the user. When the vehicle of the user receives the set travel route from the entry and leaving management server 9, the vehicle of the user performs autonomous driving along the set travel route to be moved from the boarding and alighting place 4 to the empty parking space 3.

On the other hand, the same applies when the vehicle leaves the parking lot 1. For example, when the user arrives at the boarding and alighting place 4, the user transmits a leaving request together with the vehicle ID for identifying the own vehicle to the entry and leaving management server 9 via the communication network from the mobile terminal of the user. Upon receiving the leaving request, the entry and leaving management server 9 sets a travel route for the vehicle such that the vehicle can reach the boarding and alighting place 4 from the parking space 3 where the vehicle is parked without coming into contact with other vehicles and pedestrians, and transmits the set travel route to the vehicle of the user. When the vehicle of the user receives the set travel route from the entry and leaving management server 9, the vehicle of the user performs autonomous driving along the set travel route to be moved from the parking space 3 where the vehicle is parked to the boarding and alighting place 4.

In the automatic parking lot, a large number of infrastructure sensors are normally arranged in order to detect the parking situation of a vehicle in the parking lot or to set the travel route for the vehicle. FIGS. 1 and 2 each illustrate a part of the area in the automatic parking lot, and in the example shown in FIGS. 1 and 2, a case is shown in which four infrastructure sensors S1, S2, S3, and S4 are installed in order to detect the state of the area in the automatic parking lot. A camera, a laser sensor, or the like can be used as the infrastructure sensors S1, S2, S3, and S4, but a case in which a camera is used as the infrastructure sensors S1, S2, S3, and S4 will be described below as an example. That is, a case in which the image of the inside of the parking lot 1 is captured by the infrastructure sensors S1, S2, S3, and S4 will be described as an example.

First, the infrastructure sensor S1 will be described. As shown in FIG. 2, the infrastructure sensor S1 is installed at a position higher than that of the vehicle 6. Further, referring to FIGS. 1 and 2, the detection range of the infrastructure sensor S1 when viewed from above is indicated by $\theta_1$ in FIG. 1, and the detection range of the infrastructure sensor S1 when viewed from the lateral direction is indicated by $\theta_S$ in FIG. 2. On the other hand, the detection range of the infrastructure sensor S1 starting from the infrastructure sensor S1 is indicated by $R_1$. Similarly, the detection ranges of the other infrastructure sensors S2, S3, and S4 when viewed from above are indicated by $\theta_2$, $\theta_3$, and $\theta_4$, respectively, and the detection ranges of the infrastructure sensors S2, S3, and S4 starting from the infrastructure sensors S2, S3, and S4 are indicated by $R_2$, $R_3$, and $R_4$, respectively. The image signals captured by the infrastructure sensors S1, S2, S3, and S4 are transmitted to the entry and leaving management server 9.

Figure 3:
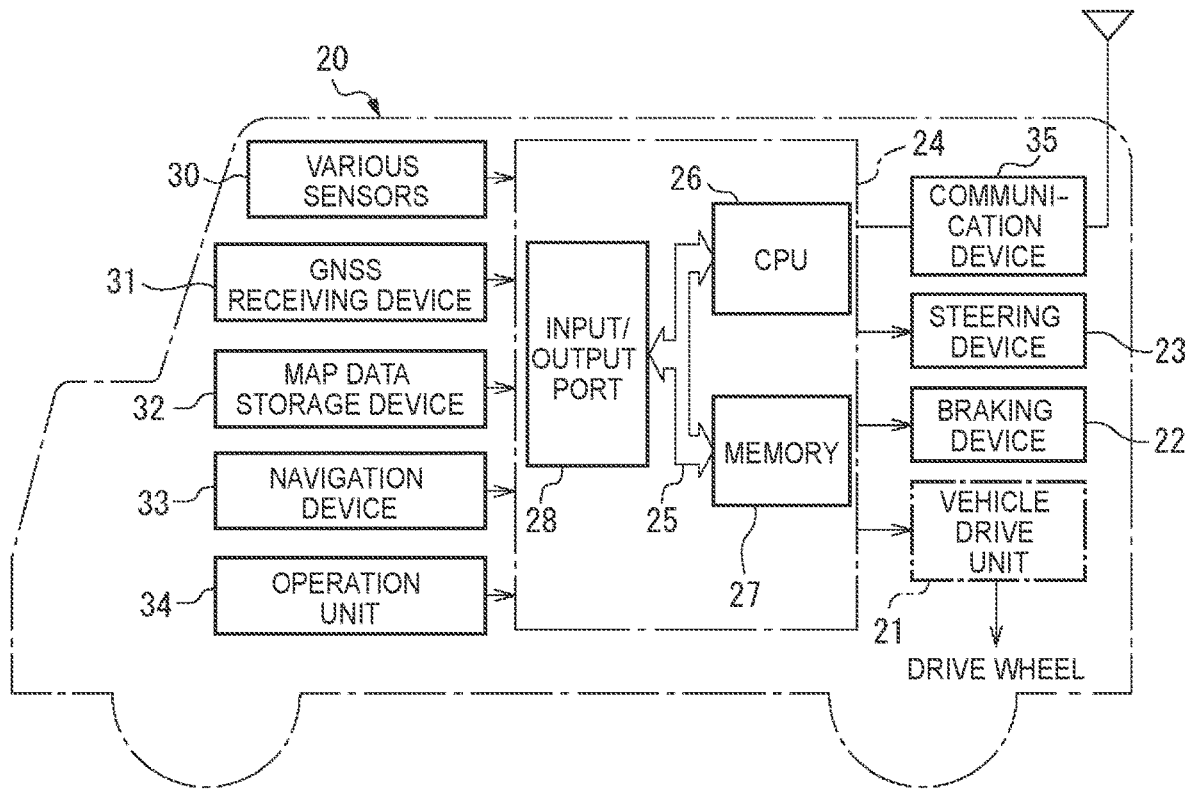
FIG. 3 is a diagram graphically illustrating a vehicle.

FIG. 3 graphically illustrates an example of a vehicle 20 suitable for use in an automatic parking service, and such a vehicle 20 is used as autonomous vehicle 5, 6, 7, and 8 shown in FIGS. 1 and 2. Referring to FIG. 3, the numeral 21 indicates a vehicle drive unit for applying a driving force to drive wheels of the vehicle 20, the numeral 22 indicates a braking device for braking the vehicle 20, the numeral 23 indicates a steering device for steering the vehicle 20, and the numeral 24 indicates an electronic control unit mounted in the vehicle 20. As shown in FIG. 3, the electronic control unit 24 is composed of a digital computer, and includes a central processing unit (CPU: microprocessor) 26, a memory 27 composed of a read-only memory (ROM) and a random access memory (RAM), and an input/output port 28 that are connected to each other by a bidirectional bus 25.

On the other hand, as shown in FIG. 3, the vehicle 20 is provided with various sensors 30 necessary for the vehicle 20 to perform autonomous driving, that is, a sensor for detecting the state of the vehicle 20 and a sensor for detecting the periphery of the vehicle 20. In this case, an acceleration sensor, a speed sensor, and an azimuth angle sensor are used as the sensors for detecting the state of the vehicle 20, and an on-board camera for capturing images of the front, the side, and the rear of the vehicle 20, light detection and ranging (LIDAR), a radar, and the like are used as the sensors for detecting the periphery of the vehicle 20. Further, the vehicle 20 is provided with a Global Navigation Satellite System (GNSS) receiving device 31, a map data storage device 32, a navigation device 33, and an operation unit 34 for performing various operations. The GNSS receiving device 31 can detect the current position of the vehicle 20 (for example, the latitude and longitude of the vehicle 20) based on the information obtained from a plurality of artificial satellites. Thus, the current position of the vehicle 20 can be acquired by the GNSS receiving device 31. As the GNSS receiving device 31, for example, a global positioning system (GPS) receiving device is used.

The map data storage device 32 stores map data and the like necessary for the vehicle 20 to perform autonomous driving. Further, an operation unit 34 is provided with an operation panel necessary for autonomous driving or the like, and when a destination is input on the operation panel, the travel route for the vehicle 20 is searched using the navigation device 33. These various sensors 30, the GNSS receiving device 31, the map data storage device 32, the navigation device 33, and the operation unit 34 are connected to the electronic control unit 24. In the embodiment according to the present disclosure, the vehicle drive unit 21 is composed of an electric motor driven by a secondary battery or an electric motor driven by a fuel cell. Driving of the drive wheels is controlled by the electric motor described above in accordance with an output signal from the electronic control unit 24. Further, the braking control of the vehicle 20 is executed by the braking device 22 in accordance with the output signal from the electronic control unit 24. The steering control of the vehicle 20 is executed by the steering device 23 in accordance with the output signal from the electronic control unit 24.

Figure 4:
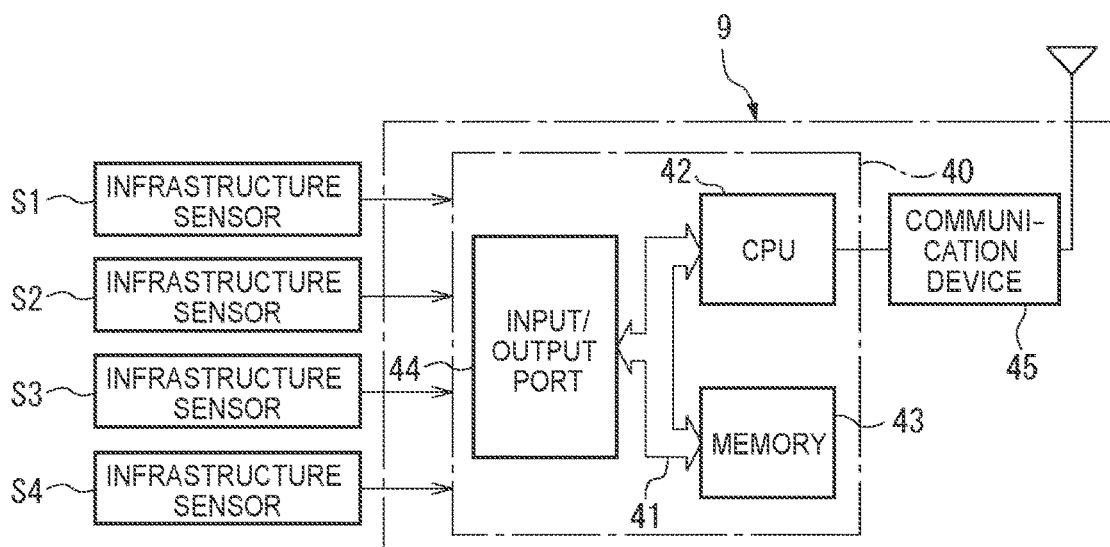
FIG. 4 is a diagram graphically illustrating a parking lot management server.

On the other hand, FIG. 4 shows the entry and leaving management server 9 of FIG. 1. As shown in FIG. 4, an electronic control unit 40 is installed in this entry and leaving management server 9. The electronic control unit 40 is composed of a digital computer, and includes a CPU (microprocessor) 42, a memory 43 composed of a ROM and a RAM, and an input/output port 44 that are connected to each other by a bidirectional bus 41. A communication device 45 for communicating with the vehicle 20 is also installed in the entry and leaving management server 9. On the other hand, the vehicle 20 is equipped with a communication device 35 for communicating with the entry and leaving management server 9. As shown in FIG. 4, the image signals captured by the infrastructure sensors S1, S2, S3, and S4 are input to the electronic control unit 40. Further, the map data of the parking lot 1 is stored in the memory 43 of the electronic control unit 40.

Returning to FIGS. 1 and 2, as described above, the image signals captured by the infrastructure sensors S1, S2, S3, and S4 are transmitted to the entry and leaving management server 9. In the entry and leaving management server 9, based on these image signals and the map data of the parking lot 1 stored in the memory 43, the existing position of the mobile body such as the vehicle and the pedestrian and the existing position of the fixed structure such as the pillars, the walls, and the floor surface on the plan map of the parking lot 1 as shown in FIG. 1 are specified. When the existing positions of the mobile body and the fixed structure are specified, the entry and leaving management server 9 sets a travel route for the vehicle on which the vehicle does not come into contact with the mobile body and the fixed structure. For example, in FIG. 1, in order for the autonomous vehicle 5 to enter the parking space, a travel route F for the autonomous vehicle 5 that allows the autonomous vehicle 5 to reach the empty parking space 3 from the boarding and alighting place 4 is set.

By the way, in this case, for example, a vehicle existing in the parking lot 1 may cause a blind spot area that does not allow the state of the parking lot 1 to be detected by the infrastructure sensors S1, S2, S3, and S4. For example, in the example shown in FIG. 1, the side area of the autonomous vehicle 6 located on the opposite side from the infrastructure sensor S1 (the shaded areas indicated by B1 and B2 in FIG. 1) is a blind spot area that does not allow the state of the parking lot 1 to be detected by the infrastructure sensor S1. However, in this case, of the side areas B1 and B2 of the autonomous vehicle 6 located on the opposite side from the infrastructure sensor S1, the side area B2 is an area that allows the state of the parking lot 1 to be detected by the infrastructure sensor S3. Therefore, in the example shown in FIG. 1, the side area B1 of the autonomous vehicle 6 located on the opposite side from the infrastructure sensor S1 is a blind spot area that does not allow the state of the parking lot 1 to be detected by the infrastructure sensors S1, S2, S3, and S4.

When such a blind spot area B1 exists, it is difficult to set a travel route for the vehicle on which the vehicle may not come into contact with the mobile body or the fixed structure. Therefore, in the embodiment according to the present disclosure, the state of the parking lot 1 in the area including the blind spot area B1 is acquired from a vehicle existing around the blind spot area B1 and having an on-board sensor capable of detecting the state of the parking lot 1 in the area including the blind spot area B1, for example, a vehicle equipped with a camera, and based on the state of the parking lot 1 detected by the infrastructure sensors S1, S2, S3, and S4, and the state of the parking lot 1 that includes the blind spot area B1 and that is detected by the on-board sensor of the vehicle in the parking lot 1, the travel route for the vehicle travelling in the parking lot 1 is generated.

In this case, the image of the state of the parking lot 1 including the blind spot area B1 can be captured by any one of an on-board camera for capturing the image of the front of the autonomous vehicle 6 causing the blind spot area B1, an on-board camera for capturing the image of the side thereof, and an on-board camera for capturing the image of the rear thereof in many cases. Therefore, when the travel route is generated, an image signal from any one of the on-board camera for capturing the image of the front of the autonomous vehicle 6, the on-board camera for capturing the image of the side thereof, and the on-board camera for capturing the image of the rear thereof is used. Further, in the example shown in FIG. 1, the image of the state of the parking lot 1 including the blind spot area B1 can be captured by an on-board camera for capturing the image of the front of each of the autonomous vehicles 7 and 8 (each of $\theta_7$ and $\theta_8$ in FIG. 1 indicates the image captured area of the on-board camera for capturing the front of each of the autonomous vehicles 7 and 8). Therefore, when the travel route is generated, the image signal from the on-board camera for capturing the image of the front of each of the autonomous vehicles 7 and 8 is also used.

Figure 5:
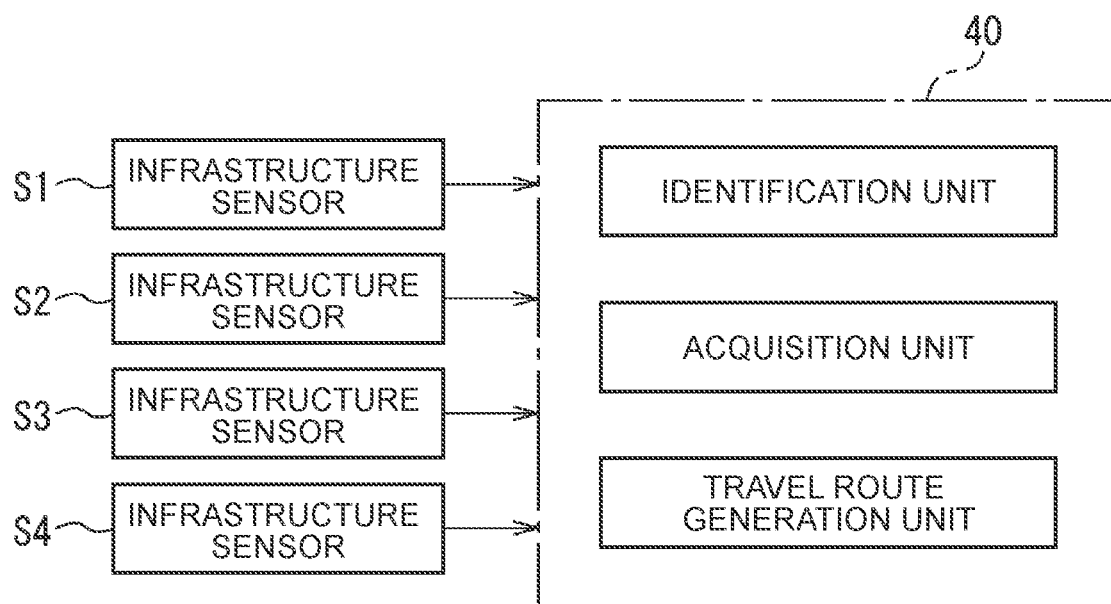
FIG. 5 is a functional configuration diagram of an embodiment according to the present disclosure.

That is, the embodiment according to the present disclosure provides, as shown in the functional configuration diagram of FIG. 5, the infrastructure sensors S1, S2, S3, and S4 capable of detecting the state of the parking lot 1 in the parking lot area, an identification unit that identifies the blind spot area that does not allow the state of the parking lot 1 to be detected by the infrastructure sensors S1, S2, S3, and S4 in the parking lot area, an acquisition unit that acquires the state of the parking lot 1 including the blind spot area, the state of the parking lot 1 being detected by the on-board sensor of the vehicle in the parking lot 1, and a travel route generation unit that generates the travel route for the vehicle traveling in the parking lot 1 based on the state of the parking lot 1 detected by the infrastructure sensors S1, S2, S3, and S4 and the state of the parking lot 1 that includes the blind spot area and that is detected by the on-board sensor of the vehicle in the parking lot 1. In this case, in the embodiment according to the present disclosure, the electronic control unit 40 of the entry and leaving management server 9 constitutes the identification unit, the acquisition unit, and the travel route generation unit.

Further, in the embodiment according to the present disclosure, in an automatic parking method using the infrastructure sensors S1, S2, S3, and S4 capable of detecting the state of the parking lot 1 in the parking lot area, the automatic parking method includes identifying the blind spot area that does not allow the state of the parking lot 1 to be detected by the infrastructure sensors S1, S2, S3, and S4 in the parking lot area, acquiring the state of the parking lot 1 including the blind spot area, the state of the parking lot 1 being detected by the on-board sensor of the vehicle in the parking lot 1, and generating the travel route for the vehicle traveling in the parking lot 1 based on the state of the parking lot 1 detected by the infrastructure sensors S1, S2, S3, and S4 and the state of the parking lot 1 that includes the blind spot area and that is detected by the on-board sensor of the vehicle in the parking lot 1.

Further, in the embodiment according to the present disclosure, in a program for executing automatic parking using the infrastructure sensors S1, S2, S3, and S4 capable of detecting the state of the parking lot 1 in the parking lot area, the program causes a computer to function so as to identify the blind spot area that does not allow the state of the parking lot 1 to be detected by the infrastructure sensors S1, S2, S3, and S4 in the parking lot area, acquire the state of the parking lot 1 including the blind spot area, the state of the parking lot 1 being detected by the on-board sensor of the vehicle in the parking lot 1, and generate the travel route for the vehicle traveling in the parking lot 1 based on the state of the parking lot 1 detected by the infrastructure sensors S1, S2, S3, and S4 and the state of the parking lot 1 that includes the blind spot area and that is detected by the on-board sensor of the vehicle in the parking lot 1. Further, the embodiment according to the present disclosure provides a storage medium storing the program.

Figure 6:
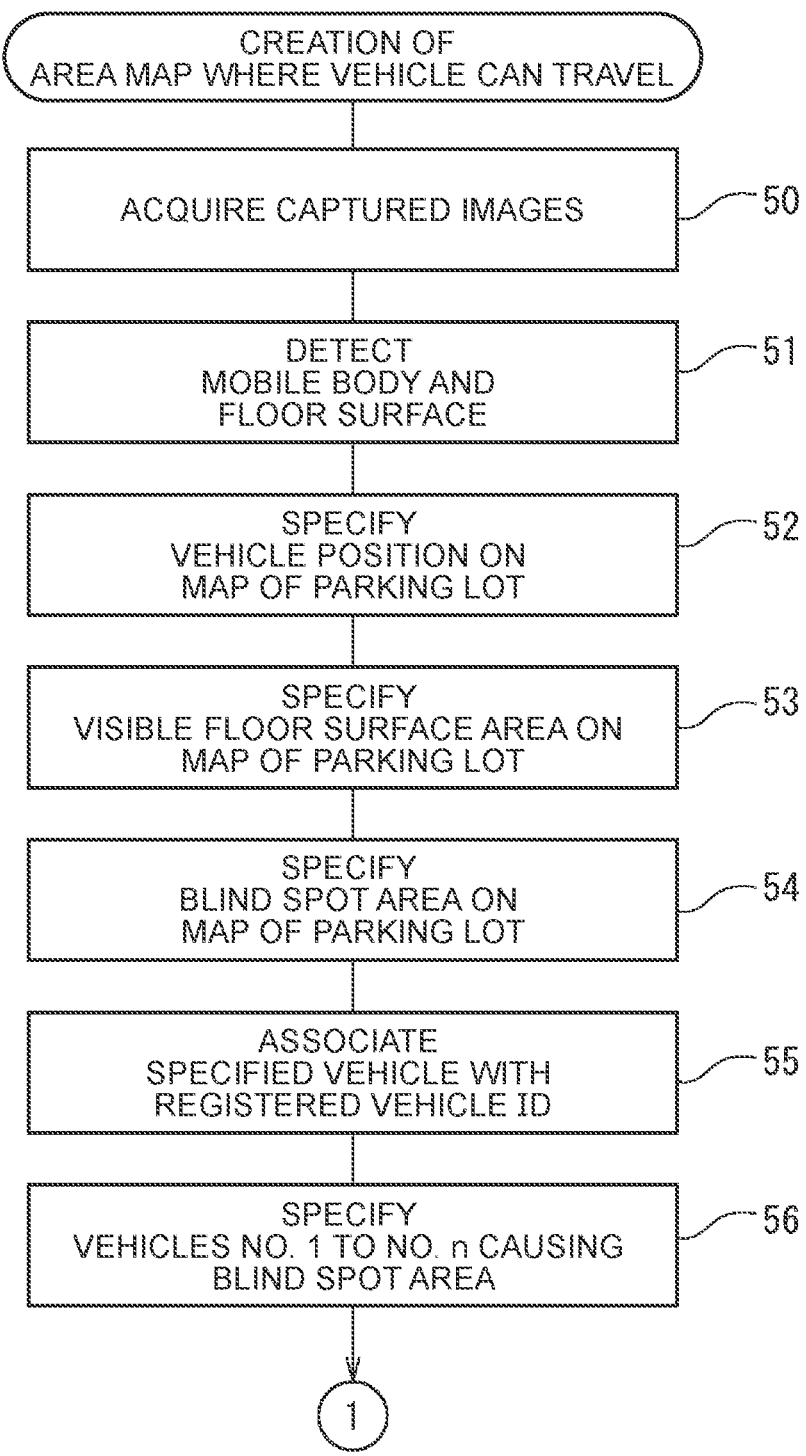
FIG. 6 is a flowchart for creating an area map where a vehicle can travel.
Figure 7:
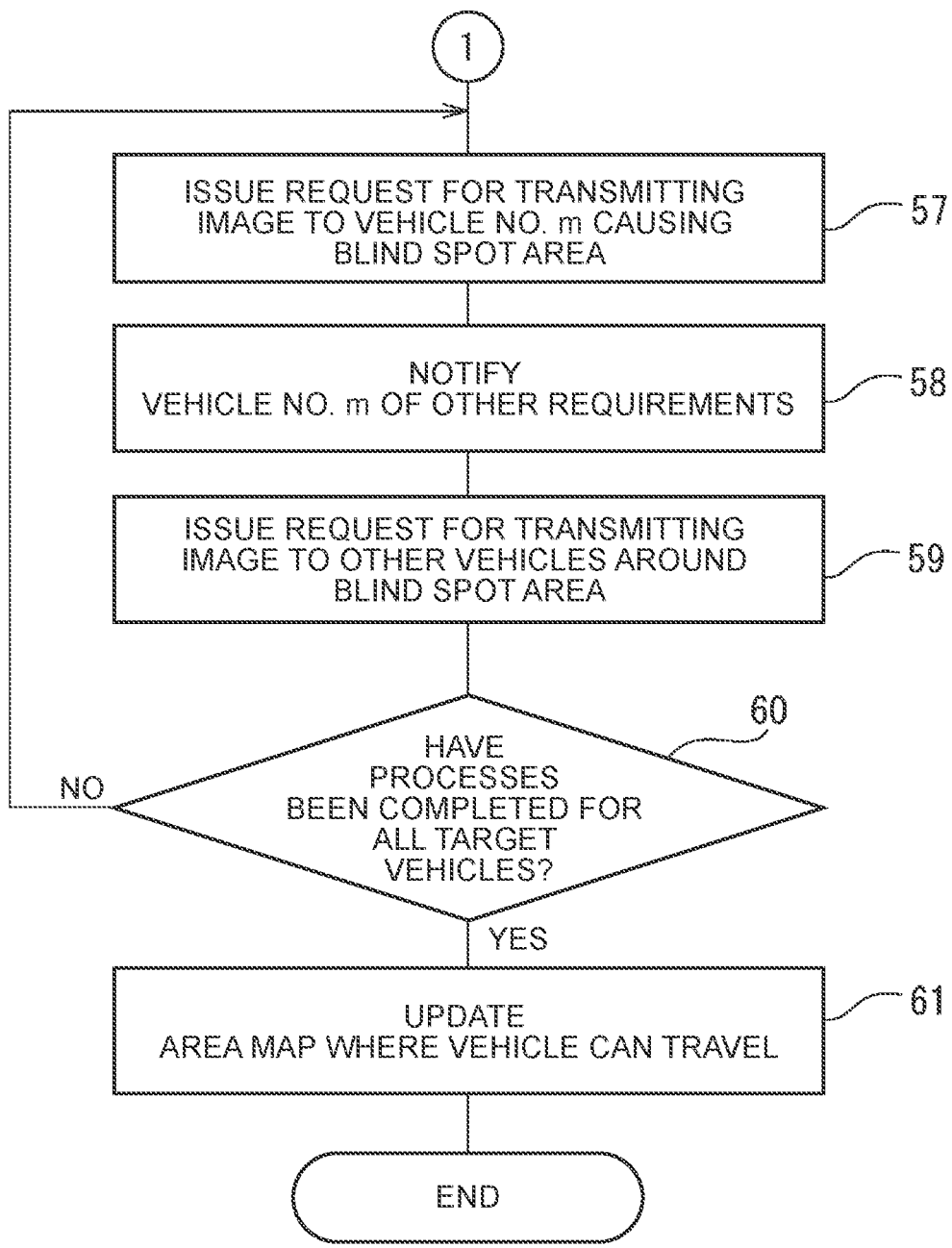
FIG. 7 is a flowchart for creating an area map where a vehicle can travel.

Next, referring to FIGS. 6 and 7, a method of creating a map indicating an area where the vehicle 20 can travel in the parking lot 1, that is, an area map where the vehicle can travel will be described. FIGS. 6 and 7 each show a routine for creating the area map where the vehicle can travel, and this routine is repeatedly executed in the electronic control unit 40 of the entry and leaving management server 9.

Referring to FIGS. 6 and 7, first, in step 50, the images captured by the infrastructure sensors S1, S2, S3, and S4 are acquired. Next, in step 51, the mobile body such as the vehicles 20 and the pedestrians in the parking lot 1 and the floor surface of the parking lot 1 are detected by an object detection method using convolutional neural network (CNN) or the like. That is, the states of the vehicles 20 or the like in the parking lot 1 and the state of the passages in the parking lot 1 are detected. Since the floor surface detected at this time is a floor surface portion directly visible from the infrastructure sensors S1, S2, S3, and S4, the detected floor surface is hereinafter referred to as a visible floor surface.

Next, in step 52, the positions of the detected vehicles 20 on the plan map of the parking lot 1 are specified based on the map data of the parking lot 1 stored in the memory 43 of the electronic control unit 40. Next, in step 53, the position of the detected visible floor surface area on the plan map of the parking lot 1 is specified based on the map data of the parking lot 1 stored in the memory 43 of the electronic control unit 40. Next, in step 54, the position of the blind spot area on the plan map of the parking lot 1 is specified based on the positions of the vehicles 20 specified in step 52 and the position of the visible floor surface area specified in step 53.

In this case, the area obtained by excluding the areas of the vehicles 20 and the visible floor surface area specified on the plan map of the parking lot 1 is the blind spot area, but in step 54, the blind spot area required for setting the travel route is specified as a blind spot area. For example, the area between the vehicle 20 and the vehicle 20 parked in the adjacent parking space 3 is also a blind spot area, but such a blind spot area is excluded from the specified blind spot area. Next, in step 55, the specified vehicle 20 on the plan map of the parking lot 1 and the vehicle ID registered in the entry and leaving management server 9 are associated with each other.

Next, in step 56, vehicles No. 1 to No. n causing a blind spot area are specified from among the specified vehicles 20 based on the positional relationship between the positions of the vehicles 20 and the visible floor surface area specified on the plan map of the parking lot 1. Next, in step 57, a request for transmitting an image signal captured by the on-board camera for capturing the image of the front of the vehicle, the on-board camera for capturing the image of the side of the vehicle, and the on-board camera for capturing the image of the rear of the vehicle is issued to the vehicle No. m causing the blind spot area. In the example shown in FIG. 1, a request for transmitting the image signal captured by the on-board camera for capturing the image of the front of the vehicle, the on-board camera for capturing the image of the side of the vehicle, and the on-board camera for capturing the image of the rear of the vehicle is issued to the parked autonomous vehicle 6, and the image signal captured by each on-board camera is transmitted from the autonomous vehicle 6 to the entry and leaving management server 9.

Next, in step 58, other requirements are notified to the vehicle No. m causing the blind spot area. For example, the vehicle No. m causing the blind spot area is notified that the blind spot area is caused. In addition, a charge can be imposed on the vehicle No. m causing the blind spot area. In this case, for example, when the vehicle No. m causing the blind spot area is a manually driven vehicle, an owner of the vehicle No. m can be notified that a charge is imposed if the vehicle will be parked for long times, and movement of the vehicle No. m can be promoted.

Next, in step 59, a request for transmitting the image signal captured by at least one of the on-board camera that can capture the image of the blind spot area from among the on-board camera for capturing the image of the front of the vehicle, the on-board camera for capturing the image of the side of the vehicle, and the on-board camera for capturing the image of the rear of the vehicle is issued to the vehicle 20 existing around the blind spot area, and the image signal of the area including the blind spot area captured by the on-board camera is transmitted from the vehicle 20 existing around the blind spot area to the entry and leaving management server 9. In the example shown in FIG. 1, a request for transmitting the image signal captured by the on-board camera for capturing the image of the front of each of the vehicles is issued to the parked autonomous vehicles 7 and 8, and the image signal captured by the on-board camera for capturing the image of the front of each of the vehicles is transmitted from the autonomous vehicles 7 and 8 to the entry and leaving management server 9.

Then, in step 60, it is determined whether the processes from step 57 to step 59 have been completed for all the specified vehicles 20 from No. 1 to No. n. When it is determined that the processes from step 57 to step 59 have not been completed for all the specified vehicles 20 from No. 1 to No. n, the process returns to step 57, and the processes from step 57 to step 59 are performed for the specified vehicle No. m+1. On the other hand, in step 60, when it is determined that the processes from step 57 to step 59 have been completed for all the specified vehicles 20 from No. 1 to No. n, the process proceeds to step 61.

In step 61, based on the image signal from each on-board camera transmitted from each of the vehicles No. 1 to No. n causing the blind spot area, and the image signal from each on-board camera transmitted from the vehicle 20 existing around each blind spot area, the plan map shown in FIG. 1, which indicates the area where the vehicle 20 can travel without coming contact with the mobile body and the fixed structure in the parking lot 1, that is, the area map where the vehicle can travel is updated. Based on this updated area map where the vehicle can travel, the travel route of the vehicle 20 is set.

Figure 8:
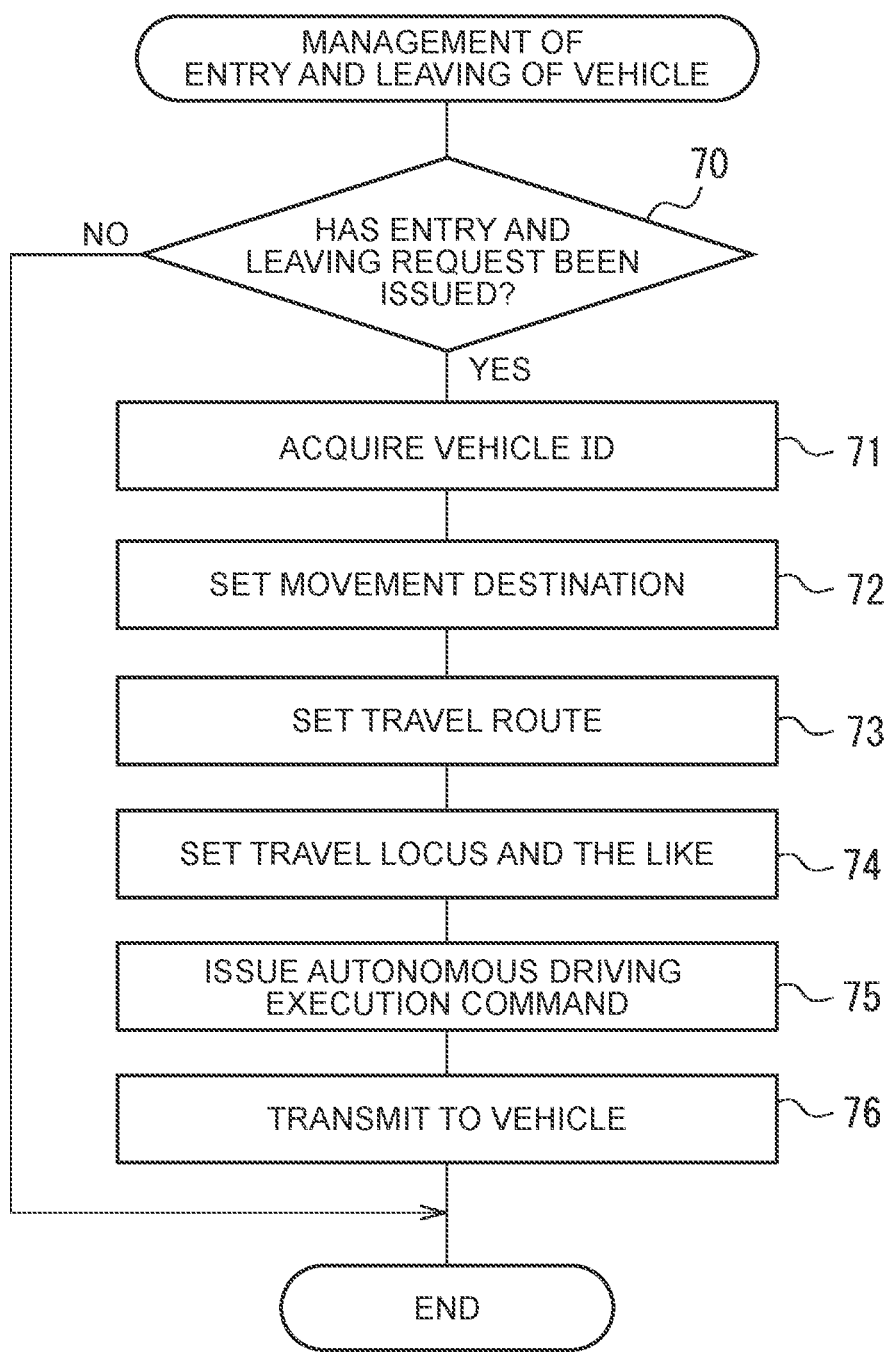
FIG. 8 is a flowchart for managing entry and leaving of the vehicle.

FIG. 8 shows an entry and leaving management routine executed by the electronic control unit 40 of the entry and leaving management server 9 in order to manage entry and leaving of the vehicle 20 in the parking lot 1.

Referring to FIG. 8, first, in step 70, it is determined whether an entry and leaving request of the vehicle 20 has been issued from the user of the vehicle 20 to the entry and leaving management server 9. When the entry and leaving request of the vehicle 20 has been issued, the process proceeds to step 71, and the vehicle ID of the vehicle 20 entering and leaving the parking space is acquired. Next, in step 72, a movement destination of the vehicle 20 is set. In this case, when the entry request has been issued, an empty parking space 3 is set as the movement destination of the vehicle 20 from among the multiple parking spaces 3. On the other hand, when the leaving request has been issued, the boarding and alighting place 4 is set as the movement destination of the vehicle 20. Once the movement destination is set, the process proceeds to step 73, and based on the area map where the vehicle can travel, which has been updated by the routine shown in FIGS. 6 and 7, the travel route from the boarding and alighting place 4 to the empty parking space 3, or the travel route from the parking space 3 to the boarding and alighting place 4, is set.

Then, in step 74, based on the area map where the vehicle can travel, which has been updated by the routine shown in FIGS. 6 and 7, the travel locus and the travel speed of the vehicle 20 at which the vehicle 20 does not come into contact with the mobile body and the fixed structure are determined Next, in step 75, an autonomous driving execution command for the vehicle 20 is issued, and then in step 76, the set movement destination, travel route, travel locus, and travel speed, and the autonomous driving execution command are transmitted to the vehicle 20 from the entry and leaving management server 9.

Figure 9:
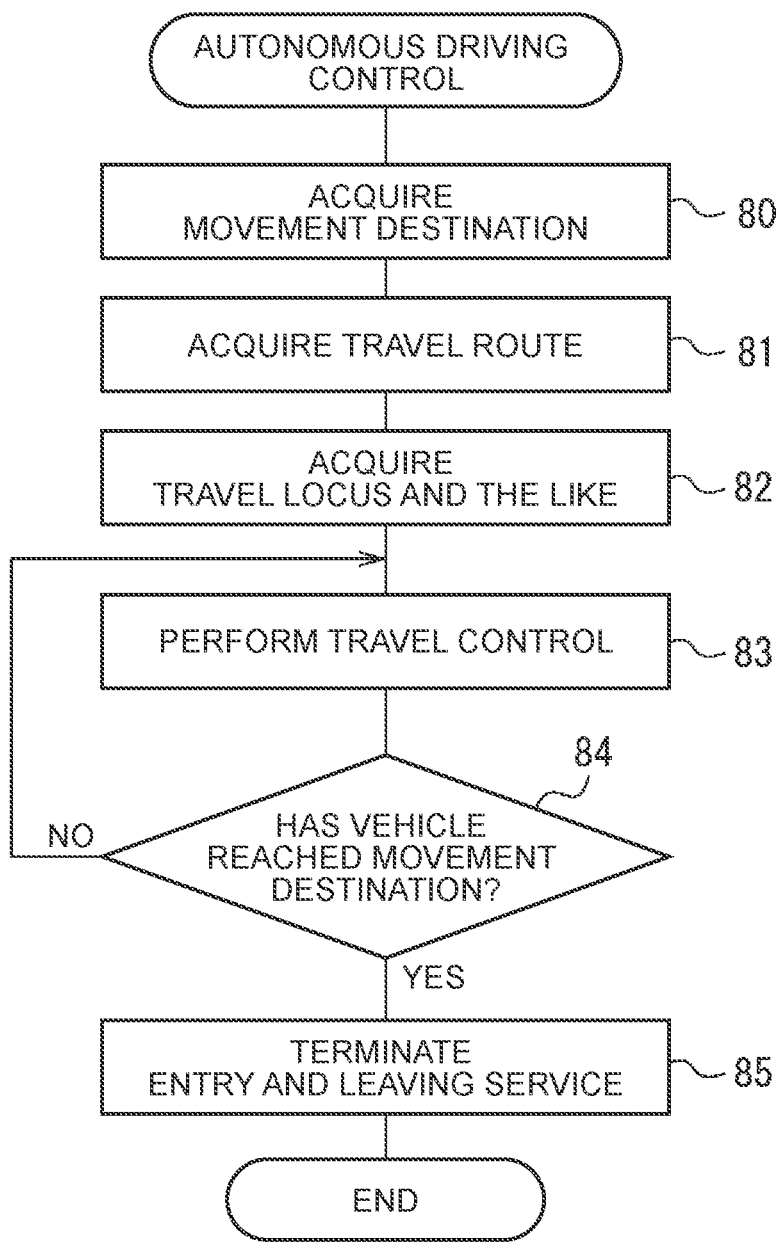
FIG. 9 is a flowchart for performing autonomous driving control.

When the autonomous driving execution command is transmitted from the entry and leaving management server 9 to the vehicle 20, the autonomous driving control of the vehicle 20 is started. FIG. 9 shows a routine for performing autonomous driving control of the vehicle 20, and this routine is repeatedly executed in the electronic control unit 24 mounted on the vehicle 20.

Referring to FIG. 9, first, in step 80, the movement destination set in the entry and leaving management server 9 is acquired, and then in step 81, the travel route set in the entry and leaving management server 9 is acquired. In step 82, the travel locus and the travel speed set in the entry and leaving management server 9 are acquired. Next, in step 83, the travel control for the vehicle 20 is performed along the set travel locus so as not to come into contact with other vehicles and pedestrians based on the detection result of the sensors such as the camera for capturing the image of the front or the like of the vehicle 20, the LIDAR, and the radar. Next, in step 84, it is determined whether the vehicle 20 has reached the movement destination. When it is determined that the vehicle 20 has not reached the destination, the process returns to step 83, and the autonomous driving of the vehicle 20 is continued. On the other hand, when it is determined in step 84 that the vehicle 20 has reached the movement destination, the process proceeds to step 85, and the entry and leaving service of the vehicle 20 is terminated.

What is claimed is:

1. An automatic parking system comprising:
   an infrastructure sensor that is able to detect a state of a parking lot; and
   an electronic control unit, including a processor, configured to:
   identify a blind spot area that does not allow the state of the parking lot to be detected by the infrastructure sensor in the parking lot;
   acquire the state of the parking lot including the blind spot area, the state of the parking lot being detected by an on-board sensor of a vehicle in the parking lot; and
   generate a travel route for a vehicle traveling in the parking lot based on the state of the parking lot detected by the infrastructure sensor and the state of the parking lot that includes the blind spot area and that is detected by the on-board sensor of the vehicle in the parking lot.

2. The automatic parking system according to claim 1, wherein the state of the parking lot includes a state of a passage in the parking lot and a state of the vehicle in the parking lot, the electronic control unit configured to:
   identify the blind spot area that does not allow the state of the passage in the parking lot to be detected by the infrastructure sensor in the parking lot,
   acquire the state of the passage including the blind spot area, the state of the passage in the parking lot being detected by the on-board sensor of the vehicle in the parking lot, and
   generate the travel route for the vehicle traveling in the parking lot based on the state of the passage in the parking lot detected by the infrastructure sensor, and the state of the passage in the parking lot that includes the blind spot area and that is detected by the on-board sensor of the vehicle in the parking lot.

3. The automatic parking system according to claim 1, comprising an entry and leaving management server that manages entry and leaving of vehicles in the parking lot, wherein the entry and leaving management server comprises the electronic control.

4. The automatic parking system according to claim 1, wherein the infrastructure sensor includes multiple cameras for capturing images of the parking lot, and the electronic control unit configured to:
   identify the blind spot area that is not able to be detected by the cameras based on the images of the parking lot captured by the multiple cameras.

5. The automatic parking system according to claim 1, wherein the electronic control unit configured to:
   identify a vehicle causing the blind spot area, and based on a state of a passage in the parking lot that includes the blind spot area and that is detected by the on-board sensor of one or more vehicles from among the vehicle causing the blind spot area and vehicles existing around the blind spot area, a travel route of the vehicle is generated.

6. The automatic parking system according to claim 5, wherein the vehicle causing the blind spot area is notified that the blind spot area is caused.

7. The automatic parking system according to claim 6, wherein a charge is imposed on the vehicle causing the blind spot area.

8. An automatic parking method using an infrastructure sensor that is able to detect a state of a parking lot, the automatic parking method comprising:
   identifying a blind spot area that does not allow the state of the parking lot to be detected by the infrastructure sensor in the parking lot;
   acquiring the state of the parking lot including the blind spot area, the state of the parking lot being detected by an on-board sensor of a vehicle in the parking lot; and
   generating a travel route for a vehicle traveling in the parking lot based on the state of the parking lot detected by the infrastructure sensor and the state of the parking lot that includes the blind spot area and that is detected by the on-board sensor of the vehicle in the parking lot.

9. A non-transitory storage medium storing a program for executing automatic parking using an infrastructure sensor that is able to detect a state of a parking lot, the program causing a computer to function so as to
   identify a blind spot area that does not allow the state of the parking lot to be detected by the infrastructure sensor in the parking lot;

acquire the state of the parking lot including the blind spot area, the state of the parking lot being detected by an on-board sensor of a vehicle in the parking lot; and
generate a travel route for a vehicle traveling in the parking lot based on the state of the parking lot detected by the infrastructure sensor and the state of the parking lot that includes the blind spot area and that is detected by the on-board sensor of the vehicle in the parking lot.

* * * * *